United States Patent
Jaakkola

(10) Patent No.: US 9,739,506 B2
(45) Date of Patent: Aug. 22, 2017

(54) SOLAR ENERGY HARVESTING

(71) Applicant: SOLIXI OY, Vantaa (FI)

(72) Inventor: Jyri Jaakkola, Vantaa (FI)

(73) Assignee: SOLIXI OY, Vantaa (FI)

( * ) Notice: Subject to any disclaimer, the term of this patent is extended or adjusted under 35 U.S.C. 154(b) by 257 days.

(21) Appl. No.: 14/355,881

(22) PCT Filed: Nov. 1, 2012

(86) PCT No.: PCT/FI2012/051063
§ 371 (c)(1),
(2) Date: May 2, 2014

(87) PCT Pub. No.: WO2013/064744
PCT Pub. Date: May 10, 2013

(65) Prior Publication Data
US 2014/0305490 A1   Oct. 16, 2014

(30) Foreign Application Priority Data
Nov. 4, 2011 (FI) .......................... 20110383

(51) Int. Cl.
*F24J 2/38* (2014.01)
*F24J 2/04* (2006.01)
(Continued)

(52) U.S. Cl.
CPC .............. *F24J 2/38* (2013.01); *F24J 2/0494* (2013.01); *F24J 2/16* (2013.01); *F24J 2/40* (2013.01);
(Continued)

(58) Field of Classification Search
CPC ................... F24J 2/0494; F24J 2/38
(Continued)

(56) References Cited

U.S. PATENT DOCUMENTS 3,974,824 A * 8/1976 Smith ................. F21V 7/04
126/658
4,137,897 A  2/1979 Moore
(Continued)

FOREIGN PATENT DOCUMENTS

DE  29914113 U1  10/1999
DE  19846364 A1  4/2000
(Continued)

OTHER PUBLICATIONS

Extended European Search Report received for European Patent Application No. EP14192817.6, dated Mar. 13, 2015, 7 pages.
(Continued)

*Primary Examiner* — Avinash Savani
*Assistant Examiner* — Aaron Heyamoto
(74) *Attorney, Agent, or Firm* — Ziegler IP Law Group, LLC

(57) ABSTRACT

An solar energy harvester and method for controlling the solar energy harvester, in which an insolation collector is formed of one or more elements each having two opposite major sides, a first side and a second side, and being configured to collect energy from insolation incident on any of the first and second sides. A cradle enables installation of the insolation collector on a roof with the first side generally towards the sun independently of the form of the roof. One or more heliostats reflect insolation to the second side of the insolation collector. A controller controls the one or more heliostats to maintain reflected insolation incident on the collector and to decrease the reflected insolation incident on the collector when necessary to inhibit the insolation collector receiving insolation exceeding given threshold through its first and second sides.

10 Claims, 4 Drawing Sheets

(51) Int. Cl.
*F24J 2/16* (2006.01)
*F24J 2/40* (2006.01)
*F24J 2/54* (2006.01)
*F24D 3/00* (2006.01)

(52) U.S. Cl.
CPC .............. *F24J 2/5417* (2013.01); *F24D 3/00* (2013.01); *F24D 2200/14* (2013.01); *Y02B 10/20* (2013.01); *Y02B 10/22* (2013.01); *Y02E 10/44* (2013.01); *Y02E 10/47* (2013.01); *Y10T 29/49355* (2015.01)

(58) Field of Classification Search
USPC .................. 126/600, 601, 623, 628; 136/248
See application file for complete search history.

(56) References Cited

U.S. PATENT DOCUMENTS

| | | | |
|---|---|---|---|
| 5,937,663 | A | 8/1999 | Chen et al. |
| 2011/0030672 | A1* | 2/2011 | Olsson .................. E04D 13/033 126/574 |
| 2011/0067743 | A1 | 3/2011 | Pan |
| 2011/0079215 | A1 | 4/2011 | Xiang |
| 2011/0203573 | A1 | 8/2011 | Hollis et al. |
| 2011/0308512 | A1* | 12/2011 | Nakasato .................. F24J 2/14 126/585 |

FOREIGN PATENT DOCUMENTS

| | | | |
|---|---|---|---|
| DE | 202012006244 U1 | 11/2013 | |
| FR | 1601101 A | 8/1970 | |
| FR | 2405443 A1 | 5/1979 | |
| JP | 59013858 A | 1/1984 | |
| JP | 04171987 A1 * | 6/1992 | |
| NL | 1009011 C1 | 5/1999 | |
| WO | 2005/090873 A1 | 9/2005 | |
| WO | 2006/112638 A1 | 10/2006 | |
| WO | 2008/113121 A1 | 9/2008 | |
| WO | 2010/014754 A2 | 2/2010 | |
| WO | 2010032110 A1 | 3/2010 | |
| WO | WO 2011035037 A2 * | 3/2011 | ................ C02F 1/14 |
| WO | 2013/121361 A2 | 8/2013 | |
| WO | 2013/121361 A3 | 10/2013 | |

OTHER PUBLICATIONS

Extended European Search Report received for European Patent Application No. EP12846714.9, dated Mar. 17, 2015, 9 Pages.

\* cited by examiner

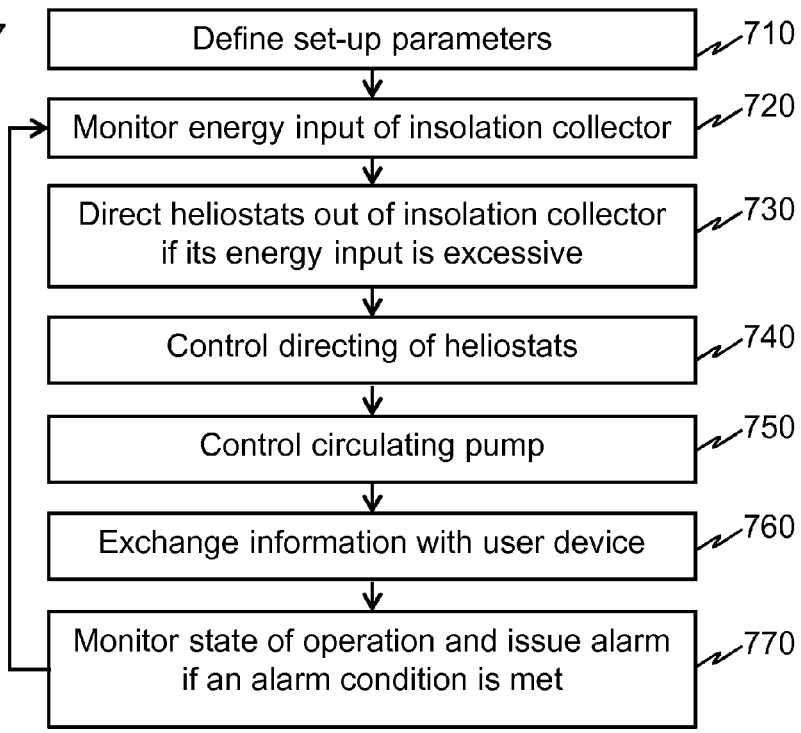
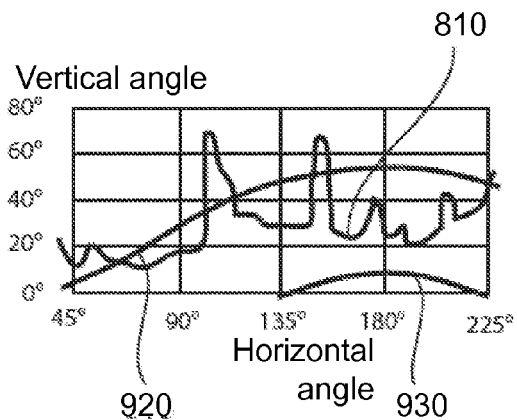
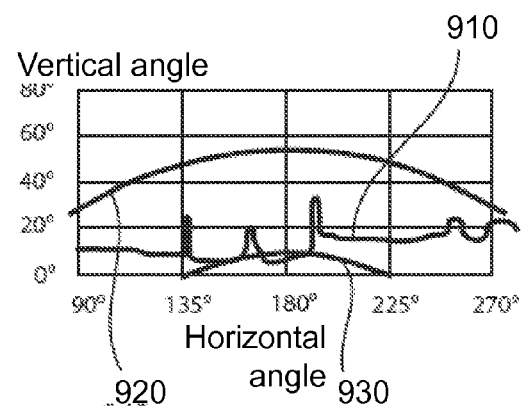

SOLAR ENERGY HARVESTING

TECHNICAL FIELD

The aspects of the present disclosure generally relate to solar energy harvesting. The aspects of the present disclosure relates particularly, though not exclusively, to enhancing winter time operation of domestic thermal solar energy collectors.

BACKGROUND ART

Renewable energy consumption should be increased to reduce $CO_2$ emissions. There are politically agreed programs to subsidize such power production with windmills. Wood pellet burners and solar energy stations are also becoming more usual. However, solar energy is poorly suited for electricity production at higher latitudes because electricity production drastically is at the lowest while the need is at its peak during winter months. Instead, thermal solar energy panels have a higher efficiency that solar photovoltaic panels do. Thermal solar panels also outperform electricity producing solar panels with economic and efficient energy storage.

Solar energy use is not a new invention. It is believed that Archimedes used as a weapon a "burning glass" to project a burning beam on invading Roman fleet. Modern large solar power plants concentrate sunlight from a field of heliostats that surround a solar power tower in which water or molten salt is heated. In such applications, a heat collector is elevated high up in a tower so that solar energy or insolation more accurately (heat flux from sun shine) can be reflected from a large area to the heat collector. Solar towers require very large insolation reflection field in comparison to the collector in order to gain high temperatures needed for economically sufficient efficiency. Moreover, in solar energy plants, electric surges caused by lightning may break the heliostats and pumps used for transfer of heat transfer medium, or expensive surge protection is required. Large solar power plants have transformers for connecting to a grid at high voltages (tens of kilovolts or even hundreds of kilovolts). Then, lightning surges travelling kilometers on the power lines are respectively downscaled by the transformers so that the surge voltages may remain at safe levels. However, smaller units without transformers e.g. at rooftops of commercial buildings are easily broken by surge voltages if not particularly surge protected.

Recently, very small scale thermal solar panels have been installed at small sites as well, even on roofs of detached houses. On the roofs, the installations are typically made along a roof surface. Such panels are yet relatively inefficient because they are not at a right angle towards the sun when the sun shines with the highest intensity. Moreover, the panels on the roof are typically exposed to accruing snow, ice and dirt which reduce their efficiency or require continuous maintenance. There are also solar panels installed on sun trackers that keep the solar panels directed towards the sun. However, in case of thermal solar panels, tracker mounted panels would require repeated flexing of heat transfer medium pipes or hoses. Thermal solar panels are also typically far heavier than photovoltaic (PV) panels that produce electricity, which sets particular mechanical requirements to use of thermal solar panels with a sun tracker mechanism.

The aspects of the present disclosure advantageously avoid or mitigate problems present in the existing solar energy harvesting systems, especially in small scale solar energy harvesting systems. Another aspect of the present disclosure advantageously provides a new technical alternative for solar energy harvesting.

SUMMARY

According to a first example aspect of the present disclosure there is provided an apparatus comprising:
an insolation collector formed of one or more elements each having two opposite major sides, a first side and a second side, and being configured to collect energy from insolation incident on any of the first and second sides;
a cradle configured to enable installation of the insolation collector on a roof at an angle optimized for energy harvesting during autumn to spring, with the first side generally towards the sun independently of the form of the roof;
one or more heliostats configured to reflect insolation to the second side of the insolation collector;
cradling means for mounting the heliostats on the roof; and
a controller configured to control the one or more heliostats to maintain reflected insolation incident on the collector and to decrease the reflected insolation incident on the collector when necessary to inhibit the insolation collector receiving insolation exceeding given threshold through its first and second sides.

The first side being generally towards the sun may refer to the normal of the first side being in horizontal direction i.e. when seen from top or in horizontal plane generally towards the sun.

The cradle may comprise a mounting part configured to support the insolation collector in desired direction and to allow insolation incident on the second side of the insolation collector. Insolation incident on the second side of the insolation collector may be allowed to a proportion of surface area of the second side that is greater than X percent, wherein X is greater than 75, preferable 90 or 95.

The cradle may further comprise a fitting part comprising two or more adjustable legs for roof mounting. The adjustable legs may be extendable linearly and/or pivotally.

The fitting part may enable adjustment of height of the insolation collector.

The fitting part and/or the mounting part may enable free adjustment of horizontal angle of the insolation collector.

The fitting part and/or the mounting part may enable adjustment of vertical angle of the insolation collector.

The cradle may enable mounting of the insolation collector at a sunny location on most roofs regardless of the angle and direction of the roof. The cradle may be installed at a highest part of the roof.

The insolation collector may be mounted towards south.

The location of the cradle on the roof may be selected based on optimal energy production taking into account the track of the sun with relation to the roof. The free locations of the one or more heliostats may be also accounted for so as to select a location of the cradle enabling efficient energy harvesting.

The heliostats may reside in a sector between northeast and northwest with respect to the insolation collector. The heliostats may be configured to reflect solar power to the second side that otherwise would not receive substantial amounts of solar power.

The apparatus may also comprise a heat exchanger for a hot water reservoir. The hot water reservoir may reside below the insolation collector such that circulation of heat transfer medium through the heat exchanger occurs by natural convection.

The capacity of the insolation collector may be relatively low. Said capacity may be barely sufficient or insufficient in summer time at the maximum insolation. The hot water reservoir may be dimensioned according to the capacity of the insolation collector when operating alone in its mounting position and direction.

The insolation collector may be installed at a height over the roof such that the second side of the insolation collector is visible to the heliostats. The line of sight between the heliostats and the insolation collector may be configured high enough not to become obscured by normal winters' snow layers.

The apparatus may further comprise one or more heliostat supports. The heliostat supports may have identical structure with the cradle. Alternatively, the heliostat supports may have a corresponding structure with the cradle but different scale.

The apparatus may comprise an interconnection structure between one or more of the heliostat supports and at least one another heliostat support and/or the cradle. The interconnection structure may comprise one or more beams, wires, straps, or other members capable of at least one of pushing and pulling.

The interconnection structure may be configured to stabilize interconnected parts with each other.

The insolation collector may be planar. The insolation collector may comprise a plurality of tubes arranged in a planar configuration such that as a whole, the insolation collector is planar.

The insolation collector may be statically installed.

The insolation collector may be configured to operate at maximum temperatures that are not substantially over 100° C. The maximum operating temperature of the insolation collector may be 100° C. to 130° C.

Said direction in which the cradle is configured to maintain the insolation collector may be such that the second side is closer to vertical than horizontal orientation.

The collector may be an evacuated solar tube collector configured to operate using evaporation enthalpy.

The collector may be configured to operate with first heat transfer medium. The apparatus may further comprise a heat exchanger configured transfer heat from said first heat transfer medium to second heat transfer medium.

At least most of the one or more heliostats may locate within a short range from the collector 110, the short range being 1 to 10 times maximum diameter of reflective surface of the heliostat in question. Advantageously, the short range enables reflecting significant addition of insolation to the collector when sun light is diffuse e.g. because of clouds.

The one or more heliostats may have planar reflective surfaces.

The reflective surfaces of the one or more heliostats may share a common size.

The reflective surfaces of the one or more heliostats and insolation collecting area of the second side of the collector may share a common size.

The apparatus may further comprise a photo-voltaic unit configured to produce electricity for operating the one or more heliostats and/or a pump that transfers heat transfer fluid through the insolation collector.

According to a second example aspect of the present disclosure there is provided a method comprising:
mounting a collector in a cradle of the first example aspect on top of a roof of a building generally towards the sun at an angle optimized for energy harvesting during autumn to spring, the collector being a planar insolation collector formed of one or more elements each having two opposite major sides, a first side and a second side, and being configured to collect energy from insolation incident on any of the first and second sides;
mounting on the roof one or more heliostats configured to reflect insolation to the second side of the insolation collector; and
configuring a controller to control the one or more heliostats to maintain reflected insolation incident on the collector and to decrease the reflected insolation incident on the collector when necessary to inhibit the insolation collector receiving insolation exceeding given threshold through its first and second sides.

According to a third example aspect of the present disclosure there is provided a computer program comprising computer executable program code which when executed by at least one processor causes an apparatus at least to perform:

According to a fourth example aspect of the present disclosure there is provided a computer program product comprising a non-transitory computer readable medium having the computer program of the third example aspect stored thereon.

Any foregoing non-transitory memory medium may comprise a digital data storage such as a data disc or diskette, optical storage, magnetic storage, or opto-magnetic storage. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present disclosure have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which:

FIG. 7 shows a flow chart according to one embodiment of the invention;

FIG. 8 shows an exemplary horizon when seen from a typical mounting position of an insolation collector on a slope of a roof;

FIG. 9 shows an exemplary horizon when seen from a typical mounting position of an insolation collector when installed on a roof in a cradle as in FIG. 5;

DETAILED DESCRIPTION

In the following description, like reference signs denote like elements.

Figure 1:
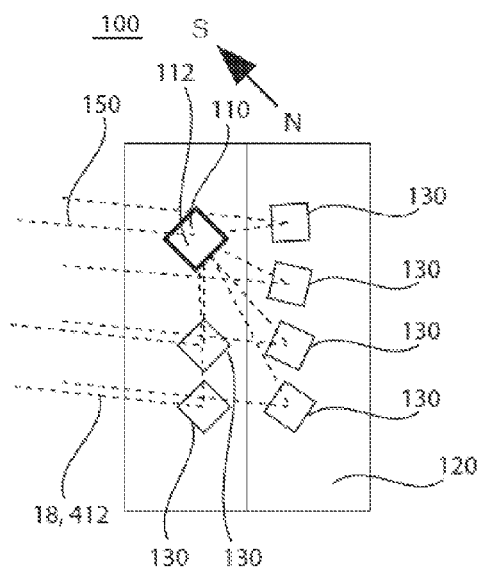
FIGS. 1 to 3 show a schematic drawing of a system according to an embodiment of the invention with different directions of sunshine.
Figure 2:
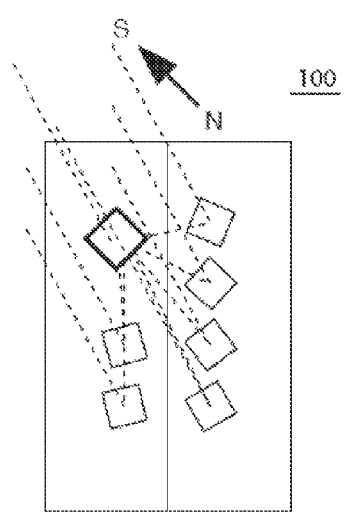
Figure 3:
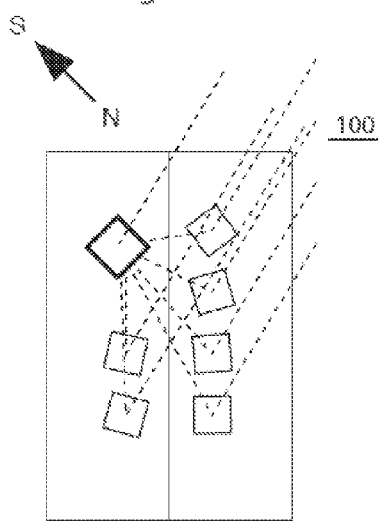
Figure 4:
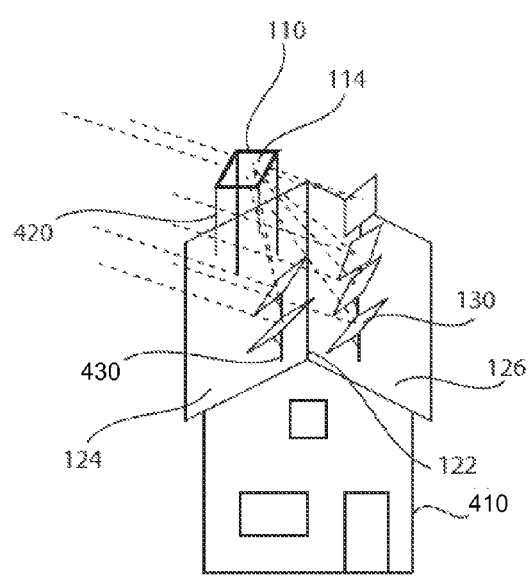
FIG. 4 shows a schematic perspective drawing of the system of FIGS. 1 to 3.

FIGS. 1 to 3 show a schematic drawing of a system 100 according to an embodiment of the invention representing different time of day and thus different directions of sunshine, while FIG. 4 shows a schematic perspective drawing of the system. On a roof 120 of a house 410 (FIG. 4), there is a ridge 122 and two faces or slopes 124, 126 on either side of the ridge 122. Located in this example, on a first slope 124, there is an insolation collector 110 mounted towards south and at a steep vertical angle of approximately 60 degrees (62 degrees is near optimal at latitude of Helsinki, Finland over winter time). Rays of sun 150 i.e. insolation is incident on a first side 112 of an insolation collector 110. The opposite side, second side 114 (FIG. 4), of the insolation collector 110 would remain in shade. However, the system 100 further comprises a plurality (e.g. two to eight) of heliostats 130. The heliostats 130 are located near the insolation collector 110 such that preferably they do not excessively shadow each other or block each other's reflection to the insolation collector 11.

The insolation collector 110 is fixed to a first cradle 420. The heliostats are mounted on second cradles 430.

The insolation collector 110 is located taking into account the horizontal shadows (910 in FIG. 9) and the need to maintain line of sight with the heliostats 130 roughly behind the insolation collector 110, when seen from south. When located on top of the roof 120 and directly towards the sun, rather than along a slope 124,126 of the roof, the capacity of the insolation collector 110 is typically far greater than if the insolation collector 110 were mounted along a slope 124,126 of the roof.

The insolation collector 110 is located in an example embodiment generally towards the sun so that, when seen in the horizontal plane i.e. in the horizontal direction, the normal of the first side 112 of the insolation collector is towards the sun for enabling the receiving of the insolation from the sun by the first side 112 of the insolation collector 110. As described in the foregoing, in the example installation in Helsinki Finland, the insolation collector 110 is mounted towards south.

During winter days, the heliostats 130 track sun and multiply insolation incident on the insolation collector 110. Hence, substantial amount of solar energy can be harvested during the winter months while the need for heating and illumination is the greatest. On the other hand, summer time maximum energy production might exceed the capacity of the insolation collector 110 so that one or more of the heliostats 130 would be directed away from the insolation collector 110, preferably back towards the sun so as to minimize sunshine's heating of the roof. This also reduces the need for cooling interior of the house 410. Alternatively, one or more of the heliostats 130 may be directed slightly down when not needed to reflect light to the insolation collector so as to reduce accruing of dirt on the their reflective surfaces.

Figure 5:
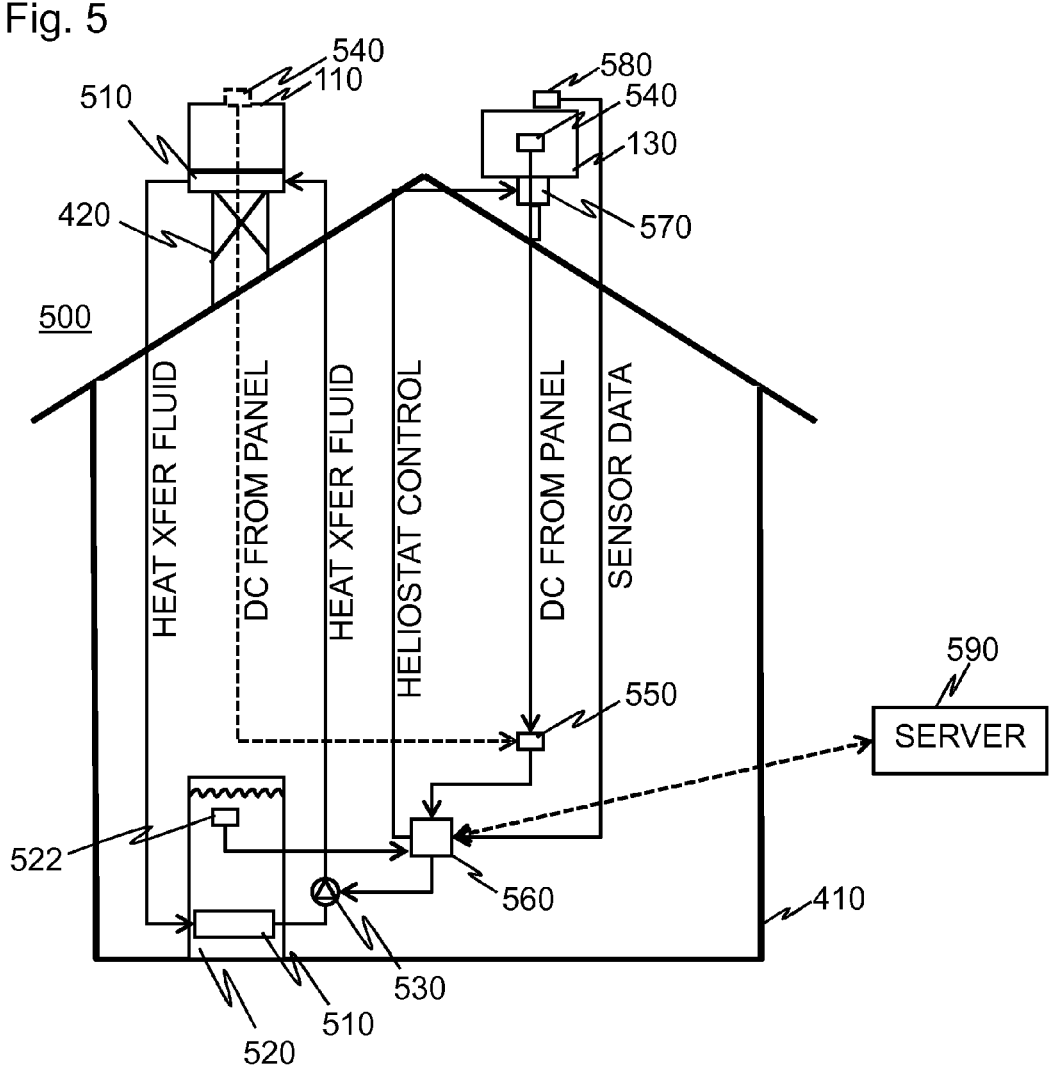
FIG. 5 shows a schematic drawing of a system illustrating further details of some embodiments of the invention.

FIG. 5 shows a schematic drawing of a system 500 illustrating further details of some embodiments of the invention. A heat exchanger 510 is located at the insolation collector 110 to transfer heat to heat transfer fluid such as mixture of water and glycol. A boiler or heat reservoir 520 is provided under the insolation collector 110, for instance in a basement of the house 410, with another heat exchanger 510 configured to transfer heat from the heat transfer fluid to the boiler 520. A circulating pump 530 such (e.g. a direct current or DC pump) is provided to circulate the heat transfer fluid through the heat exchangers 510.

In this example, one or more of the heliostats 130 and/or the insolation collector is further accompanied by a photovoltaic element for producing DC voltage to a battery 550. Alternatively, or additionally, there may be a mains-operated power supply. A controller 560 is configured to control the operation of various elements of the system 500. The controller 560 is in this embodiment simply a DC operated microcomputer with a few analogue inputs and outputs the function of which will be described with further detail in the following.

A motor system 570 is drawn in connection with the heliostat 130 to demonstrate an electrically controller actuator for tracking sun with the heliostat 130 under control of the controller 560. It is appreciated that the heliostat's 130 tracking movement may be controlled either by the controller 560 or by the heliostat 130 itself (with an internal controller), which might then receive the time and date the controller 560 or from a radio broadcast, for instance (e.g. from a CF flag of RDS transmission). Moreover, in some embodiments, the heliostat 130 may operate independently in absence of control from the controller 560. This mode may further be dependent on the season e.g. such that between predetermined dates, the heliostat 130 does or does not operate independently, as a precaution to avoid overheating of the insolation collector 110.

The boiler 520 may comprise a temperature sensor or thermostat 522 configured to output to the controller 560 temperature information or start/stop commands based on which the controller controls the operation of the circulating pump 530.

One or more sensors 580 may be located on the roof 120, for instance by fixing to the insolation collector 110, one or more of heliostats 130 or a cradle thereof. These sensors may involve, for instance, one or more of: a temperature sensor, wind speed sensor, light sensor, vibration sensor, and force sensor (indicative of force created by wind or snow, for instance). For instance, a light sensor may be used to produce an instant indication of variation of the insolation power that is received by the insolation collector 110. With faster detection of excess power, the reaction time can be substantially reduced e.g. in comparison to reacting to changes in heat transfer fluid temperature. This in turn can help to avoid overloading and breaking of parts in the system 500. It is especially noteworthy that the system 500 may have an entirely closed heat transfer fluid system in which pressure increases drastically when the temperature increases. Therefore, efficient heat control may be particularly important. In this sense, the use of a photo-voltaic element adds a further layer of security. A malfunction in electricity distribution network or simply a service break could deprive the system 500 of operating power. With the circulating pump 530 stopped and the heliostats 130 reflecting insolation on the insolation collector 110, the system 500 may break in a matter of minutes in July if configured for sufficient heat production in January.

The controller 560 controls the operation of the circulating pump 530 and also the operation of the heliostats 130 according to its programming as described with further detail with reference to FIG. 7. The controller 560 may also be capable of communicating, either directly or via a third party (e.g. mobile phone, computer or personal digital assistant device), with a remotely located server 590. Operations related to the server will be discussed with further detail with reference to FIG. 11.

The installation of the system 100 is next described with some further detail with reference to FIGS. 1 and 5. First, the system 100 is installed on the roof 120 so that a sunny location (FIG. 9) is selected for the insolation collector 110 (fixed to the first cradle 420) such that the heliostats 130 can be mounted (with second cradles 430) preferably adjacent to the insolation collector 110 and generally in a sector of north-west to north-east (over north) i.e. behind the insolation collector 110 when seen from south. In one embodiment, the heliostats 130 are mounted on two or three common interconnecting members such as rails that rest against the roof 120. The interconnecting members may further be fixed to the first cradle 420 of the insolation collector 110 so as to reduce necessary fixing points to the roof.

The fixing of the insolation collector 110 and of the heliostats 130 is made using normal roof-specific or generic technologies. In one embodiment, no holes are made to the roof at all, but the insolation collector and heliostats 130 are assembled to form one or more structures that are anchored in place using cables connected to walls of the house 410 or over gutters of the roof 120. In some embodiments, the structure is dimensioned and formed such that it form locks itself to other structures of the roof 120 (such as chimney, ridge 122, ladders etc.). In such a case, the insolation collector 110 and the heliostats 130 can be installed with very little effort.

The insolation collector 110 and the heliostats may be relatively small. For instance, the insolation collector 110 may be a square or rectangle of e.g. $0.5 m^2$ to 5 m² size. The heliostats can be of similar size, larger or smaller. For instance, the heliostats may have surface area (of reflecting surface) that ranges between 20% to 150% of the surface area of the second side 114 of the insolation collector 110.

The insolation collector 110 is installed on a first cradle 420 that has two major parts, i.e. a fixing part and a fitting part. These two major parts may be made of discrete or common elements. FIG. 5 shows a structure in which the first cradle 420 has two cross-bars interconnecting legs of the cradle and in which some legs are longer than the other. This effect is created e.g. by use of telescopic structure that is locked e.g. with clamps when the cradle is at desired height and orientation (see FIG. 9). Typically, the first cradle 420 has three or four legs. In the aforementioned embodiment in the insolation collector 110 or one or the heliostats 130 is interconnected to one or more heliostats, some legs may be substituted by diagonal supports to the foot of the other element that is installed on the roof 120. Thanks to the adjustability of the first cradles 420 and of the second cradles 430 (which may be identical in structure with the first cradles 420), the insolation collector 110 and the heliostats can be installed on the roof 120 in an optimal direction (see FIG. 9) regardless of the orientation of the roof 120 itself. For instance, looking at FIG. 9, the optimal direction may be slightly below 180 degrees for best operation by the first side 112 of the insolation collector 110. Moreover, the insolation collector is preferably mounted in a vertical orientation that is best suited for the winter months, with the objective of increasing winter time efficiency (see FIG. 10). Summer time insolation power is typically that high that non-optimal angle has little adverse effect, especially as the more steep angle increases the projection of the insolation collector 110 towards the heliostats 130 located behind or about the insolation collector 110. This further increases the capacity of the system 100 to harvest solar power in the winter time.

In one embodiment, the pump 530 operates with solar power obtained by a solar panel in connection with one or more of the heliostats 130 and the insolation collector 110. Moreover, the heliostats may be driven by solar power. In this embodiment, the system 100 can be installed without need for an electrician. Moreover, the system 100 is also entirely separated from the mains and from the grid around with the advantage that surge voltages from thunder strikes kilometers away from the system 100 do not break surge sensitive parts such as pumps and controllers. Further still, electricity is spared as the pump 530 becomes automatically stopped when insolation 150 is not available and pumping is not needed. This also extends the life time of the pump and ensures that the pump will start anytime insolation is available (and the temperatures of the insolation collector 110 and the boiler 520 make pumping feasible so that the controller 560 would control the pump 530 to operate).

Communication channels between the controller 560 and the heliostats 130 and sensors 540 may be implemented using any wired or wireless connections. The pump 530 may also be located on the roof, e.g. integrated with the insolation collector 110 so that the pump gets its electricity from a solar panel and the sensors and the pump's control interface are electrified by solar power. In this case, the controller 560 can be operated by mains power or a power line (e.g. 12 Volts DC line) can be arranged from a solar panel to the controller 560. The power line and/or control line can also be combined with a fluid pipe that connects the insolation collector 110 and the boiler 520.

The controller 560, pump 530 and the heliostats may be configured to operate with a total power of some 5 W to 30 W. The controller's own power consumption may be that low that a battery of 1000 mAh can maintain the controller operable for one or more days. The heliostats may be adjusted e.g. once a minute or few minutes, depending on the availability of insolation, need of insolation, and geometry of the system 500 (e.g. mutual angle and distance of between a given heliostat 130 and the insolation collector 110). The frequency of adjustment may vary from one heliostat 130 to another such that most proximate heliostats 130 and the heliostats that are least tangential to the sun are adjusted most frequently. Each heliostat adjustment may take a matter of seconds. Hence, the system 500 may be extremely power efficient, whether operated by photovoltaic electricity or mains electricity.

Figure 6:
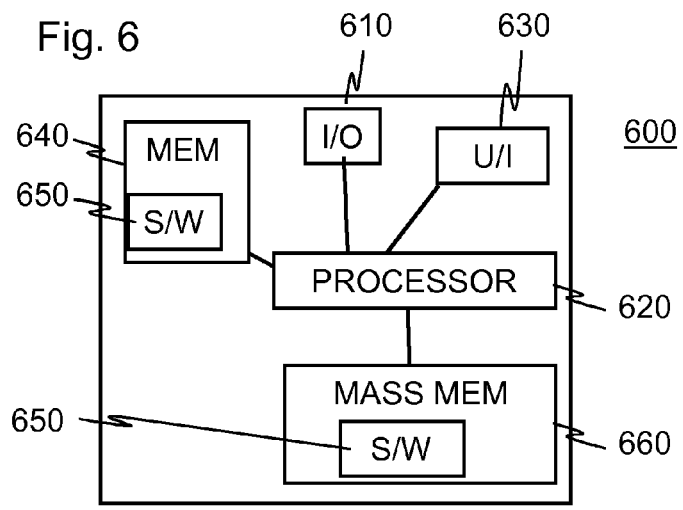
FIG. 6 shows a block diagram of a solar energy harvester according to an embodiment of the invention.

FIG. 6 shows a block diagram of an apparatus 600 according to an embodiment of the invention. The apparatus 600 has functionalities that make it suited to operate as the controller 560 or as the server 590. In practice, the controller 560 is implemented as a low-power device that has rather modest capabilities in comparison to the server 590, but either entity can be understood based on apparatus 600.

The apparatus 600 comprises an input/output (I/O) block 610 for exchanging information with other entities, a processor 620 for general control of the operations of the apparatus 600, a user interface (U/I) 630, a memory 640 that can be a typical random access memory, computer executable software (S/W) 650 or instructions for the processor 620, a non-volatile memory such as a mass memory 660 that stores the software 650 when the apparatus is not powered. The controller 560 may be battery operated with power supply to the battery from a charger and/or photovoltaic elements. In some embodiments, the controller 560 may operate solely with photovoltaic power and then power breakages are frequent.

It is appreciated that one or more of the blocks of the apparatus 600 may be integrally formed. On the other hand, any block of the apparatus 600 may be distributed or shared between two or more elements. For instance, the processor 620 may comprise one or more cores or even separate processor units operating together as one functional unit. Likewise, the memory and the processor may be formed on a single integrated circuitry, e.g. on one application specific integrated circuit (ASIC).

FIG. 7 shows a flow chart according to one embodiment of the invention. The flow chart starts from step 710 in which operating parameters of the controller 560 are initialized. For instance, the mutual locations of the insolation collector 110 and the heliostats 130 and their relation to compass directions may be stored. Other initial parameters may involve desired temperature, sizes of the heliostats and of the insolation collector, size of the boiler 520, identity of the installation, and co-ordinates of the system for calculation of the sun's track 920, 930.

The controller 560 continually monitors 720 energy input of the insolation collector 110 e.g. based on combined light sensor's output and/or temperature difference over the insolation collector 110 when the pump 530 is running. If excessive energy input on the insolation collector 110 is detected, the controller 560 commands 730 one or more of the heliostats 130 to direct their reflections away from the insolation collector 110 so as to avoid overloading hazards. Otherwise, the controller 560 may control 740 that the heliostats 130 remain directed to reflect insolation upon the second side 114 of the insolation collector while the sun is shining 150 and need for energy accumulation exists. The controller 560 also controls 750 the circulating pump 530 to run when energy is being collected from the insolation collector 110.

The controller 560 may be implemented without user interface 630 such that the controller 560 uses a user device for user interfacing. The user device can be, for instance, a Bluetooth or wireless LAN enabled mobile phone, computer, personal digital assistant, or gaming device. In such a case, the controller 560 can exchange information 760 with the user device e.g. whenever the controller 560 can establish a connection with the user device or according to a schedule such as once a week or once a year.

The controller 560 may also monitor the state of the operation of the system 100 and issue an alarm (e.g. by a sound through a speaker) if an alarm condition is met, 770. The alarm condition may be, for instance, that the temperature of the boiler 520 declines to a given low limit value, meets a high limit, that erroneous signals are received from the sensors 540 or from the motor system 570.

FIG. 8 shows an exemplary horizon or 810 skyline when seen from a typical mounting position of an insolation collector on a slope of a roof. FIG. 8 also shows the track of the sun at its extremes of June 920 and December 930. FIG. 9 shows a corresponding drawing with an exemplary horizon 910 when seen from a typical mounting position of an insolation collector as in FIG. 8 when installed on the roof in a cradle as in FIG. 5. In comparison to FIG. 8, the skyline 910 appears at far lower vertical angles and the sun shines directly from south (180°) at the insolation collector even when the sun is at its lowest track.

Figure 10:
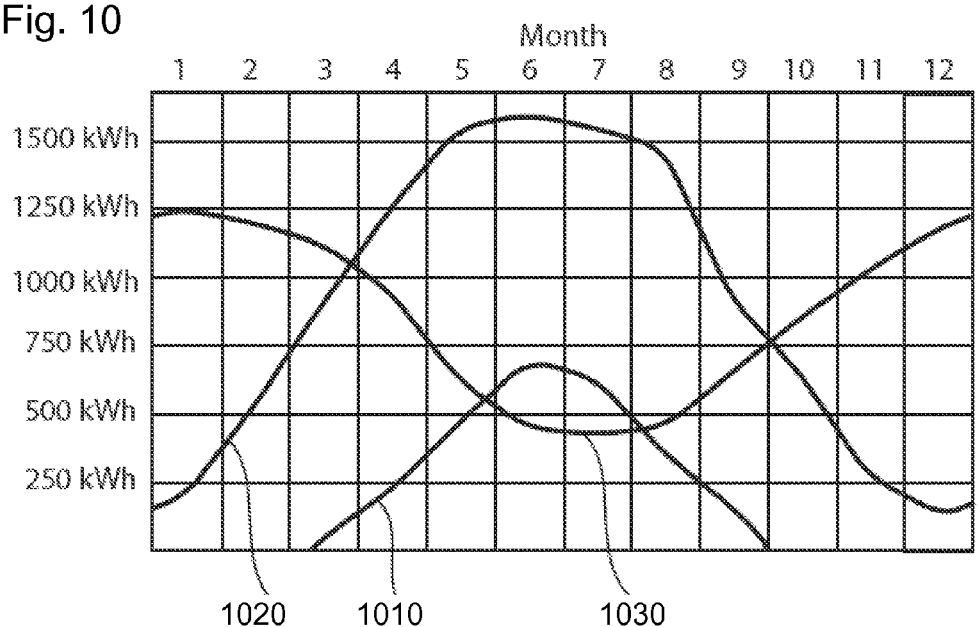
FIG. 10 shows a graph of typical available solar power and power demand during different months.

FIG. 10 shows a first graph 1010 of typical available solar energy and energy demand 1030 during different months in a system with four basic insolation collector panels mounted on a slope of a roof, see FIG. 8. A second graph 1020 shows the available solar energy in the system 500 that has only one basic insolation collector panel 110 and six heliostats 130, see FIG. 9. The basic insolation collectors 110 each have surface area of 2.25 m2 and efficiency of 60%. The roof angle is rather steep, 45° and it is towards south-east, see FIG. 8. The heliostats 130 have planar mirrors with 85% efficiency to account for some dirt on the reflective surface and some shadows that may be cast at some time of a day by trees or other elements of the system 500. The heliostats and the insolation collector are mounted (see FIG. 9) on or about the ridge 122 i.e. higher up than in the traditional slope installation. The demand of heating energy for warming of the house 410 and for heating hot water is calculated for the needs of a five person family.

The second graph 1020 shows significantly higher energy production capabilities that the first graph 1010. In particular, the period when solar energy suffices alone for the demands of this example for the entire period of April to September i.e. 6 months. The prior art system (FIG. 8) would only suffice during the highest insolation in June and July. Moreover, the system 500 produces a substantial share of the energy consumption even outside this self-energizing period. For instance, it can be seen from FIG. 10 that in January, 15% of the heat demand can be satisfied with solar power, nearly 50% in February and more than 70% in October and March. The top power in the summer months is not exploited, but during this time, the mirrors can be used to shadow the roof and reduce heating of the house 410. It is between August and May that the system 500 particularly outperforms the prior art insolation collector systems.

Notice that the comparison of (FIG. 8) four insolation collectors 110 versus (FIG. 9) one insolation collector 110 and six heliostats 130 is fair in two ways:

the insolation collectors when mounted on slopes of the roof occupy their own surface area of roof area. A heliostat of system 500 is nearly upright (above 45° N latitude or below 45° S latitude, for example) and occupies only a fraction of its surface area in roof area.

the insolation collectors are expensive parts that require heat transfer fluid circulation. The total costs of the four insolation collector system are close to those of the system of FIG. 5.

Figure 11:
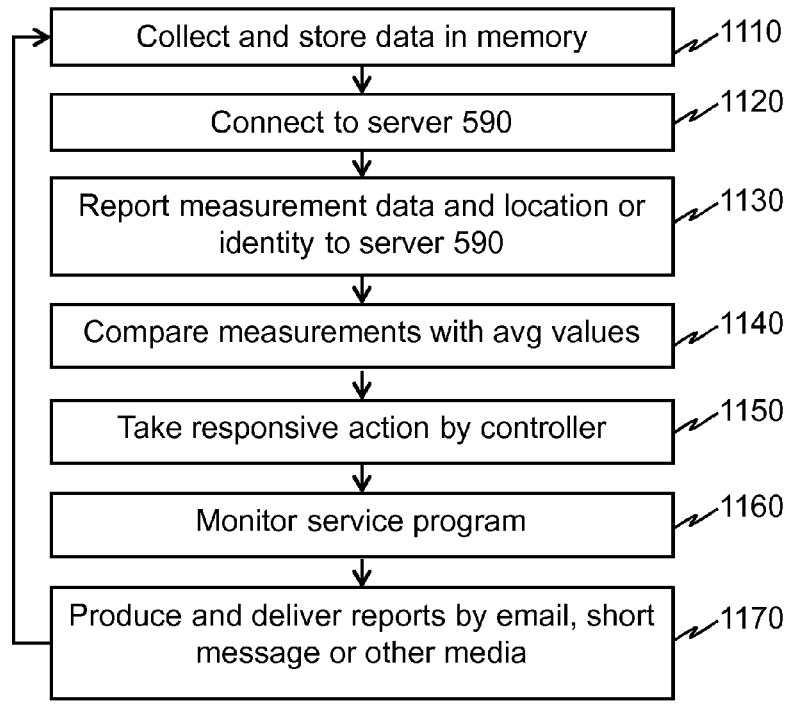
FIG. 11 shows a flow chart exemplifying processes provided by a server according to an embodiment of the invention.

FIG. 11 shows a flow chart exemplifying processes provided by a server according to an embodiment of the invention. The controller 560 collects and stores data from the sensors 522, 580 in a local memory such as its own memory 660. The controller connects 1120 periodically or when opportunities arise to the server 590. To this end, the controller 560 may employ a direct connection e.g. using a wireless LAN or mobile data connection. Alternatively, the controller 560 may first establish a connection with a user device and use that as a data carrier, either simultaneously or in a batch transfer mode. When in connection with the server 590, the controller 560 reports 1130 to the server the stored measurement data together with its location and or identity. Armed with the measurement data of the controller 560, the server 590 stores these data in its database and compares 1140 them with other measurement data received from other systems, preferably within proximate installations. If no proximate installations are available, the server 590 may interpolate or extrapolate comparison values. The server 590 then provides feedback 1150 to the controller 560. The feedback may comprise average values for comparison of the efficiency of the system with those of other users. The feedback may also comprise alarms regarding forecast weather conditions such as storms or heavy snow fall. Based on the feedback, the controller 560 may take responsively action such as issue an alarm, schedule turning of the heliostats to a storm-safe position (e.g. towards wind or against the roof or other fixed structure). The controller 560 may also update its estimates for energy consumption and for energy production, based on the feedback (such as weather forecast or statistical information obtained from other systems with similar installation and/or age, for instance). The feedback may also comprise updates to the software 650 of the controller 560.

The server 590 may also adaptively adjust service intervals for the system based on reports sent by the controller 560. In the absence of the reports, the interval may be set based on a fail-safe mode to short period such as two or three months. When the reporting is frequent, the service interval may be extended dynamically depending on the capacity and operation of the system. For instance, the controller 560 may set the maintenance just before the system's heat production capacity is expected to fall below the heat consumption 1030. The regular service can be a pre-requisite condition for the warranty and the warranty period may be extended if or dependent on that the controller 560 has a regular connection with the server 590 and the controller 560 can verify to the server 590 that the system has been appropriately services. Hence, the server 590 can monitor 1160 that the system has been properly serviced. The server 590 can also issue user reports 1170 by various media such as short messages, email, multimedia messages or synthesized phone calls to the user. These user reports may involve e.g. warnings 770 related to the system, information about available upgrades to the system 650 and information on optimizing the operation of the system 500.

In the foregoing description, the examples have related to collecting of heat by the insolation collector 110. The insolation collector 110 may alternatively or additionally be configured to produce electricity using received insolation. In case of sole photovoltaic operation, circulating pumps 530 and boilers 520 are not connected to the insolation collector 110. The embodiments relating to the control of heliostats 130 and to the co-operation with the server 590 are yet directly applicable in that case as well.

Various embodiments have been presented. It should be appreciated that in this document, words comprise, include and contain are each used as open-ended expressions with no intended exclusivity The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this present disclosure may be used to advantage without the corresponding use of other features. As such, the foregoing description shall be considered as merely illustrative of the principles of the present disclosure, and not in limitation thereof. Hence, the scope of the present disclosure is only restricted by the appended patent claims.

The invention claimed is:

1. A solar power harvester comprising:
    an insolation collector formed of one or more elements each having two opposite sides, a first side and a second side, and being configured to collect energy from insolation incident on any of the first and second sides, wherein the insolation collector is planar;
    a cradle comprising different length legs, the cradle configured to enable static installation of the insolation collector on a roof regardless of the angle and direction of the roof, at an angle optimized for energy harvesting during autumn to spring to enhance winter time efficiency, with the first side towards the sun;
    a plurality of heliostats, each having a reflective surface with a size that is the same as or smaller than the second side of the insolation collector and configured to reflect insolation to the second side of the insolation collector;
    cradling means for mounting the heliostats on the roof;
    a light and insolation sensor; and
    a controller configured to control the plurality of heliostats to maintain reflected insolation incident on the second side of the insolation collector and to direct the reflected insolation away from the second side of the insolation collector when excessive energy input is detected by the light and insolation sensor in order to inhibit the insolation collector receiving insolation exceeding a given threshold through its first and second sides.

2. The solar power harvester of claim 1, wherein the cradle comprises a mounting part configured to support the insolation collector in desired direction and to allow insolation incident on the second side of the insolation collector.

3. The solar power harvester of claim 1, wherein the insolation collector is installed at a given height over the roof such that the second side of the insolation collector is visible to the plurality of heliostats.

4. The solar power harvester of claim 1, wherein the insolation collector is an evacuated solar tube collector configured to operate using evaporation enthalpy.

5. The solar power harvester of claim 1, wherein at least most of the plurality of heliostats locate within a range from the insolation collector that is 1 to 10 times maximum diameter of reflective surface of the heliostat in question.

6. The solar power harvester of claim 1, wherein the solar power harvester further comprises a photo-voltaic unit configured to produce electricity for operating any one or more of the following: the controller; the plurality of heliostats; a pump that transfers heat from the insolation collector.

7. The solar power harvester of claim 6, wherein the photo-voltaic unit is configured to run the pump when heat is being collected from the insolation collector.

8. The solar power harvester of claim 1, wherein the controller is further configured to communicate measurement data indicative of the solar power harvester to a server and to responsively receive feedback and adjust the operation of the controller.

9. The solar power harvester of claim 1, wherein the solar power harvester is separated from a mains and from a grid around.

10. A method comprising:
    mounting an insolation collector in a cradle comprising different length legs, the cradle positioned on top of a roof of a building towards the sun at an angle optimized for energy harvesting during autumn to spring to enhance winter time efficiency, the insolation collector being a planar insolation collector formed of one or more elements each having two opposite sides, a first side and a second side, and being configured to collect energy from insolation incident on any of the first and second sides;
    arranging a light and insolation sensor at the insolation collector;
    mounting on the roof a plurality of heliostats, each having a reflective surface with a size that is the same as or smaller than the second side of the insolation collector and configured to reflect insolation to the second side of the insolation collector; and configuring a controller to control the plurality of heliostats to maintain reflected insolation incident on the insolation collector and to direct the reflected insolation away from the second side of the insolation collector when excessive energy input is detected by the light and insolation sensor in order to inhibit the insolation collector receiving insolation exceeding a given threshold through its first and second sides.

* * * * *